(No Model.)
J. A. DYBLIE.
CLUTCH MECHANISM.
No. 454,261. Patented June 16, 1891.
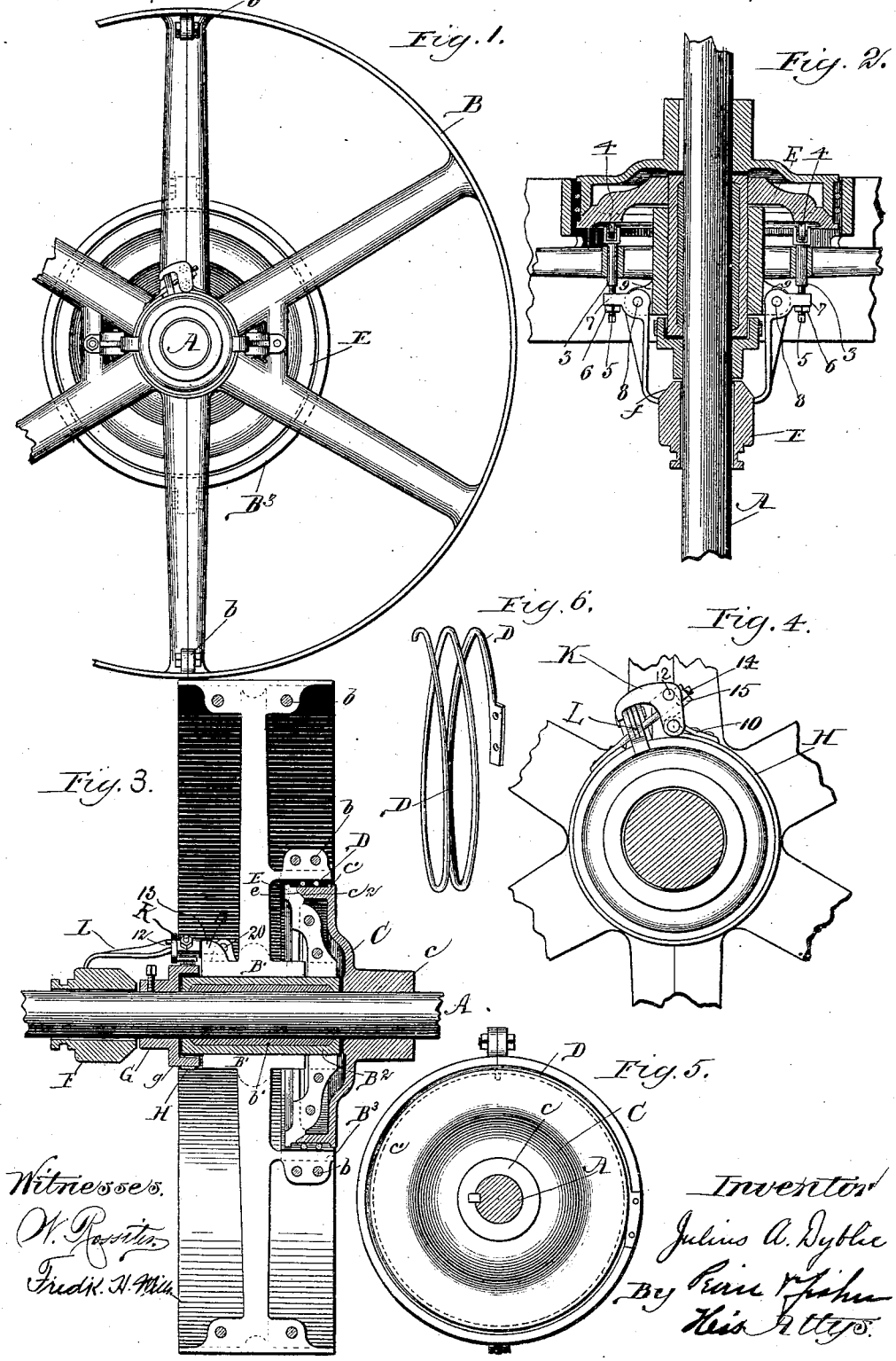
Witnesses
W. Rossiter
Fredk. H. Mill
Inventor
Julius A. Dyblie
By Prin & John
His Atty's

UNITED STATES PATENT OFFICE.

JULIUS A. DYBLIE, OF CHICAGO, ILLINOIS.

CLUTCH MECHANISM.

SPECIFICATION forming part of Letters Patent No. 454,261, dated June 16, 1891.

Application filed July 27, 1889. Serial No. 318,824. (No model.)

*To all whom it may concern:*

Be it known that I, JULIUS A. DYBLIE, a citizen of the United States, residing at Chicago, in the county of Cook and State of Illinois, have invented certain new and useful Improvements in Clutch Mechanism, of which I do declare the following to be a full, clear, and exact description, reference being had to the accompanying drawings, forming part of this specification.

My present invention has for its object to provide improvements in clutch mechanism, whereby, first, better positive clutching of the pulley or other power-transmitting device to its shaft may be secured, whereby, second, a better frictional clutching of the pulley to the shaft or like device may be had, and whereby, third, an adjustment of the mechanism can be effected without the necessity of stopping the movement of the shaft on which such mechanism is carried.

To this end my invention consists in the various novel features of construction and combination of parts hereinafter described, illustrated in the accompanying drawings, and particularly defined in the claims at the end of this specification.

Figure 1 is a view in side elevation of a pulley having my improved clutch mechanism applied thereto. Fig. 2 is a view in horizontal section, parts being shown in elevation. Fig. 3 is a view in vertical section, parts being shown in elevation. Fig. 4 is an enlarged view, in vertical section, through the shaft. Fig. 5 is a view in vertical section. Fig. 6 is a detail perspective view of the coiled rod or wire.

A designates the shaft upon which the clutch mechanism is carried, and B denotes the pulley, which serves to transmit motion through a suitable belt to the machine to be driven. The pulley B is shown as a split pulley, being formed of half-sections suitably bolted together, as at $b$, although it will be readily understood that my invention is applicable as well to both solid and split pulleys. So, also, the several other parts of the clutch mechanism which encircle the shaft A may be formed in half-sections bolted together in manner well understood in the art, or may be formed in a single piece and slipped over the shaft.

Between the shaft A and the hub B' of the pulley B is preferably placed a bushing $B^2$, the inner face of which is, by preference, chambered to receive a Babbitt-metal filling $b'$, which bears upon the shaft A and serves to relieve the parts from friction.

Upon the shaft A at one side of the bushing $B^2$ is keyed the hub $c$ of the gripping-wheel C, this wheel having a periphery $c'$, over which is wound the coiled rod or wire D. This coiled rod or wire D is preferably formed of varying diameter, for a purpose to be presently stated, and one end is attached to a projection $B^3$, preferably of annular shape, that extends outwardly from the spokes of the pulley B, while the opposite end of this coil D is connected to or engaged by the periphery of a friction plate or wheel E, that is loosely held upon the bushing $B^2$ in a manner capable of slight lateral movement to and from the periphery of the gripping-wheel C. The rim of the gripping-wheel C is furnished with a friction-surface $c^2$, preferably of beveled or conical shape, and the friction plate or wheel E is furnished also with a corresponding friction-face $e$ to bear against the friction-face of the wheel C.

In order to move the friction plate or wheel E laterally upon the bushing $B^2$ in such manner as to cause the friction-surface $e$ of this plate to forcibly contact with the friction-surface $c^2$ of the gripping-wheel C, I prefer to provide two or more push-rods 3, that pass through suitable perforations in the pulley B and carry at their forked ends friction-rolls 4, that ride against the flat side of the friction plate or wheel E. Each of the push-rods 3, if round, should be provided with a suitable spline or rib to prevent the turning of the rod and friction-roll. Against the outer ends of the push-rods 3 bear the threaded bolts 5, that pass through screw-threaded holes in the arms 7, suitable set-nuts 6 being employed to hold the bolts securely in position with respect to these arms. The arms 7, which are of like construction, are preferably in the form of bell-crank levers pivoted, as at 8, to the lugs 9, cast upon the hub of the pulley B, and the long ends of these arms or levers 7 are extended in the direction of the length of the shaft and have their ends downwardly bent in position to be struck by the cone-shaped end $f$ of the engagement-sleeve F, that is carried upon the shaft A in a manner free to slide thereon, and is operated by a suitable shifting hand-lever, as well understood in the art. From the construction of parts as thus far defined it will be seen that if the arms or levers 7 be rocked about their pivot-points by the contact with their longer ends of the engagement-sleeve F they will, through the medium of the bolts 5, force the rollers 4 of the push-rods 3 against the side of the friction-plate E, thereby causing this plate to slide upon the bushing $B^2$ until the cone-shaped friction-face $e$ of this plate E contacts with the correspondingly-shaped friction-face $c^2$ of the gripping-wheel C. As the friction-plate E is thus forced against the gripping-wheel C, that has motion imparted thereto from the shaft A, this plate will be caused to move in unison with the wheel C, and inasmuch as the coiled rod D has one end fastened to the friction-plate and its opposite end fastened to the pulley it is plain that the rotation of the friction-plate will cause the coiled rod D to tightly bind upon the periphery of the gripping-wheel C and cause the pulley B to be also rotated in unison with the gripping-wheel and friction-plate. Manifestly, also, since the rod D is coiled in the direction of the rotation of the gripping-wheel and shaft the movement imparted to the friction-plate from the gripping-wheel will tend to constantly tighten the grip of the coil upon the periphery of the gripping-wheel and thus secure a positive clutch action between such wheel and the pulley B. As soon, however, as the friction-plate E is relieved from contact with the gripping-wheel C the coil D will tend to spring away from the periphery of the gripping-wheel, and consequently no further movement will be imparted from the gripping-wheel to the pulley. It will be observed that the coiled rod or wire D is of greatest diameter adjacent the end that is attached to the projection $B^3$ of the pulley B, and from this point is of gradually-decreasing diameter, my reason for thus forming the rod or wire D being that the greatest strain is thrown upon the portion of the rod or wire adjacent the point of connection with the projection $B^3$ of the pulley, since the remaining part of the wire, being tightly wound about the periphery of the gripping-wheel C, has the strain more evenly distributed through it.

Any desired number of coils may be given to the rod or wire and any corresponding breadth may be given to the gripping-wheel C. It is obvious that the force with which the friction-plate E will bear against the gripping-wheel C will depend upon the adjustment of the threaded bolts 5 with respect to the arms or levers 7, since if the bolts are set inwardly upon the arms or levers 7 the movement of these arms or levers will exert a greater force upon the rods 3 than would occur if the bolts 5 were set farther outward in said arms. Hence it will be seen that through the medium of the bolts 5 the position of the push-rods with respect to the arms or levers can be varied and the adjustment of the frictional bearing between the friction-plate E and the gripping-wheel C can be adjusted from time to time as desired. It is plain, also, that as this adjusting mechanism is carried upon the hub of the pulley B, which is loosely held with respect to the revolving shaft A, the desired adjustment of the push-rods with respect to the arms or levers 7 can be effected without arresting the movement of the shaft A. This feature of obtaining an adjustment of the friction-plate E without stopping the movement of the shaft A is of importance, for the reason that it frequently happens that the shaft A may serve to drive several machines, so that the stopping of such shaft to effect the adjustment of any single clutch mechanism would be a serious inconvenience.

If the positive clutch mechanism hereinbefore described should be employed without any provision for imparting an initial rotation to the pulley B, there might be danger, particularly if the shaft A were revolving rapidly, of too great a strain occurring upon the parts when the friction-plate E was thrown into engagement with the gripping-wheel C in manner above defined. In order to overcome this objection, therefore, I have provided a frictional clutch mechanism whereby an initial gradual starting of the pulley B may be effected before the positive clutch mechanism above described shall be thrown into action. In order to impart from the shaft A this gradual initial movement to the pulley B, I prefer to employ, in addition to the clutch mechanism hereinbefore described, a supplemental friction-clutch, preferably of the following-described construction: Upon the shaft A at one side of the bushing $B^2$ is keyed the friction-sleeve G, the periphery $g$ of which is encircled by a friction strap or band H, that has one end permanently fastened, as at 10, to an arm of a friction-clutch lever K, that is pivotally held upon a stud 12, projecting from a bracket 13, that rises from the hub B' of the pulley B. The opposite end of the strap H is preferably attached to an arm or rod 14, one end of which passes through a perforation in the bracket 13 and is adjustably held with respect thereto by means of a set-nut 15, that engages the threaded portion of this arm or rod. The longer arm of the friction-clutch lever K is engaged by a bar or arm L, that is pivotally connected, as at 20, to the bracket 13, projecting from the hub of the pulley B, this lever L extending outwardly over the engagement-sleeve F to a distance beyond the ends of the arms or levers 7, and having its ends downwardly turned to contact with the conical end of this engagement-sleeve. My object in thus extending the arm or lever L farther outward than the arms or levers 7, that operate the positive clutch, is to insure that the arm or lever L shall be first struck by the engagement-sleeve F, thereby causing the friction band or strap H to be tightened upon the friction-sleeve G and impart a gradual initial movement to the pulley B before the engagement-sleeve F contacts with the arms or levers 7 to throw the friction-plate E into engagement with the gripping-wheel C and bring the more positive clutch mechanism into operation. From this construction it will be seen that by employing a supplemental friction-clutch to impart an initial movement to the pulley B, I am enabled to gradually start the shaft and connected mechanism before the more positive clutch is brought into action, thereby avoiding the danger of straining or breaking the parts, which might occur under certain conditions if no such provision of a supplemental clutch were made. The hub $c$ of the gripping-wheel C and the friction-sleeve G, being both fixed upon the shaft A, serve not only the functions above described, but, as well, also serve to guard the pulley B, the friction-plate E, and the bushing $B^2$ against lateral movement.

It will be readily understood that the details of construction above set out may be varied without departing from the spirit of my invention, and that certain features of invention may be employed without its adoption as an entirety.

Having thus described my invention, what I claim as new, and desire to secure by Letters Patent, is—

1. In clutch mechanism, the combination, with the shaft and pulley, of a gripping-wheel mounted on the shaft independently of the pulley, a rod or wire having multiple coils for binding upon said gripping-wheel, one end of said rod or wire being attached to the pulley, a movable plate or wheel journaled upon the shaft independently of the pulley and connected to the opposite end of the rod or wire, and a suitable means for imparting movement to said plate to cause the multiple coils of the rod or wire to bind upon the gripping-wheel, substantially as described.

2. In clutch mechanism, the combination, with the shaft and pulley, of a gripping-wheel mounted upon the shaft independently of the pulley, a rod or wire having multiple coils for binding upon the gripping-wheel, one end of said rod or wire being attached to the pulley, a friction plate or wheel mounted in a manner free to move longitudinally and rotatively on said shaft independently of the pulley, said plate or wheel being connected to said coiled rod or wire, and suitable means for forcing laterally the friction plate or wheel to cause it to bear against the gripping-wheel, substantially as described.

3. In clutch mechanism, the combination, with the shaft and pulley, of a gripping-wheel mounted upon the shaft independently of the pulley, a coiled rod or wire on said gripping-wheel and connected to the pulley, a friction plate or wheel for engaging one end of said coiled rod or wire, and an adjustable mechanism for causing the friction plate or wheel to engage with the gripping-wheel, substantially as described.

4. In clutch mechanism, the combination, with the shaft and pulley, of a gripping-wheel upon the shaft, a coiled rod or wire on said gripping-wheel and connected with the pulley, a laterally-movable friction plate or wheel for engaging one end of said coiled rod or wire, and suitable adjustable mechanism carried by the pulley for forcing the friction plate or wheel to engage with the gripping-wheel, substantially as described.

5. In clutch mechanism, the combination, with the shaft and pulley, of a gripping-wheel keyed to the shaft and having a friction-face, a friction plate or wheel loose on the shaft and having a friction-face to engage with the friction-face of the gripping-wheel, a coiled rod or wire on said gripping-wheel, one end of said coiled rod or wire being attached to the friction-plate and the opposite end being connected to the pulley, and suitable means, movable with the pulley, for throwing said friction-plate into engagement with the gripping-wheel, substantially as described.

6. In clutch mechanism, the combination, with the shaft and pulley, of a gripping-wheel upon the shaft, a coiled rod or wire on said gripping-wheel and connected to the pulley, a friction plate or wheel for engaging one end of said coiled rod or wire, suitable push-rods for forcing said friction-plate into engagement with the gripping-wheel, arms or levers for operating said push-rods, and an engagement-sleeve upon the shaft for moving said arms or levers, substantially as described.

7. In clutch mechanism, the combination, with the shaft and pulley, of a gripping-wheel upon the shaft, a friction plate or wheel on the shaft, a coiled rod or wire on said gripping-wheel for engagement with the pulley and the friction plate or wheel, suitable push-rods (one or more) for forcing said friction-plate into engagement with the gripping-wheel, arms or levers having bolts adjustably connected thereto to contact with the push-rods, and an engagement-sleeve for operating said arms or levers, substantially as described.

8. In clutch mechanism, the combination, with the shaft and pulley, of a gripping-wheel upon the shaft, a friction plate or wheel on the shaft, a coiled rod or wire on said gripping-wheel for engagement with the pulley and the friction plate or wheel, push-rods (one or more) for forcing said friction-plate into engagement with the gripping-wheel, arms or levers pivotally sustained upon the pulley-hub for operating said push-rods, and an engagement-sleeve for imparting movement to said arms or levers, substantially as described.

9. In clutch mechanism, the combination, with the shaft and pulley, of a bushing for said pulley, a gripping-wheel upon the shaft, a friction-plate laterally movable upon said bushing, a coiled rod or wire on said gripping-wheel for engagement with the pulley and the friction plate or wheel, and suitable means for moving said friction plate or wheel into engagement with the gripping-wheel, substantially as described.

10. In clutch mechanism, the combination, with the shaft and pulley, of a positive clutch for throwing the pulley into engagement with the shaft, suitable means for operating said positive clutch, and a friction-clutch for causing the initial engagement of the pulley with the shaft, said friction-clutch comprising a friction-strap attached to the pulley, a friction-sleeve on the shaft, an arm or lever for tightening said friction-strap upon said sleeve, and an engagement-sleeve for moving said arm or lever to tighten the friction-strap, substantially as described.

11. In clutch mechanism, the combination, with the shaft and pulley, of a gripping-wheel upon the shaft, a rod or wire having multiple coils for binding upon said gripping-wheel, one end of said rod or wire being connected with the pulley, a movable plate for engaging the opposite end of said rod or wire, suitable means for imparting movement to said plate to cause the rod or wire to bind upon the gripping-wheel, a friction-clutch for causing the initial engagement of the pulley with the shaft, comprising a friction-strap attached to the pulley, a friction-sleeve on the shaft, and an arm for tightening said friction-strap upon said sleeve, and an engagement-sleeve for moving said arm to tighten the friction-strap, substantially as described.

12. In clutch mechanism, the combination, with the shaft and pulley, of a positive clutch for throwing the pulley into engagement with the shaft, a friction-clutch for producing the initial engagement of the pulley with the shaft, and engagement-arms for said positive and friction clutches, said engagement-arms being of different lengths, so that the friction-clutch shall be first thrown into action, and a sliding sleeve for throwing into action first the friction-clutch and afterward the positive clutch, substantially as described.

13. In clutch mechanism, the combination, with the shaft and pulley, of a gripping-wheel upon the shaft, a friction plate or wheel on the shaft, a coiled rod or wire on said gripping-wheel and connected to the pulley and with the friction plate or wheel, suitable means for causing the friction plate or wheel to engage with the gripping-wheel, a friction-clutch, and means for throwing said friction-clutch into action in advance of the engagement of the friction plate or wheel with the gripping-wheel, substantially as described.

14. In clutch mechanism, the combination, with the shaft and pulley, of a gripping-wheel upon the shaft, a friction plate or wheel on the shaft, a coiled rod or wire on said gripping-wheel and connected with the pulley and to the friction plate or wheel, a friction-strap connected with the pulley, a friction-sleeve upon the shaft, and suitable means for tightening said friction-strap upon said sleeve, substantially as described.

JULIUS A. DYBLIE.

Witnesses:
GEO. P. FISHER, Jr.,
I. B. CARPENTER.